(12) United States Patent
Stenger et al.

(10) Patent No.: US 7,718,152 B2
(45) Date of Patent: May 18, 2010

(54) PROCESS AND SYSTEM FOR DESTROYING CARBONACEOUS MATERIALS AND COMPOSITION AND SYSTEM THEREOF

(75) Inventors: Raymond C. Stenger, Freehold, NJ (US); James A. Wasas, Point Pleasant Beach, NJ (US)

(73) Assignee: Swapsol Corp., Monmouth Junction, NJ (US)

( * ) Notice: Subject to any disclaimer, the term of this patent is extended or adjusted under 35 U.S.C. 154(b) by 80 days.

(21) Appl. No.: 11/823,417

(22) Filed: Jun. 26, 2007

(65) Prior Publication Data

US 2008/0264831 A1   Oct. 30, 2008

Related U.S. Application Data

(60) Provisional application No. 60/926,007, filed on Apr. 24, 2007, provisional application No. 60/932,698, filed on Jun. 2, 2007.

(51) Int. Cl.
*C01B 31/20* (2006.01)
*B01D 53/00* (2006.01)

(52) U.S. Cl. .................. 423/222; 423/220; 423/221

(58) Field of Classification Search .......... 423/220, 423/242.1, 222; 528/381; 588/316
See application file for complete search history.

(56) References Cited

U.S. PATENT DOCUMENTS

| | | | |
|---|---|---|---|
| 4,197,277 A | 4/1980 | Sugier et al. | |
| 4,581,442 A | 4/1986 | Adams | |
| 349,981 A | 9/1986 | Claus | |
| 4,618,723 A | 10/1986 | Herrington et al. | |
| 4,921,936 A * | 5/1990 | Adams | 528/389 |
| 6,099,819 A | 8/2000 | Srinivas et al. | |
| 7,163,670 B2 | 1/2007 | Agarwal | |
| D548,398 S | 8/2007 | Chaoui | |

2005/0191237 A1   9/2005 Selinger et al.

FOREIGN PATENT DOCUMENTS

| | | |
|---|---|---|
| KR | 2007062620 A | 6/2007 |
| WO | WO 00/56441 | 9/2000 |
| WO | WO 03/101588 | 12/2003 |

OTHER PUBLICATIONS

Lutz et al. "On the Formation of COS from H2S and CO2 in the Presence of Zeolite/Salt Compounds", Adsorption Science and Technology, 16(7), 1998, 577-581.*
Bejarano et al. "A Study on Carbonthermal Reduction of Sulfur Dioxide to Elemental Sulfur Using Oilsands Fluid Coke", Environ. Sci. Technol., 2001, 35, 800-804.*
Attar, A., Chemistry, Thermodynamics and Kinetics of Reactions of Sulphur in Coal-Gas Reactions: A Review, Fuel, Apr. 1978, vol. 57, pp. 201-212.
Steudel, R., Die Reaktion von Schwefeltrioxid mit Kohlendisulfid, Z. Anorg. Allg. Chem., 1966, 346, pp. 255-265 ("Summary" in English).
Adesina et al., Thermolysis of Hydrogen Sulphide in an Open Tubular Reactor, Int. J. Hydrogen Energy, 1995, vol. 20., No. 10, pp. 777-783.
Faraji et al., The Direct Conversion of Hydrogen Sulfide to Hydrogen and Sulfur, Int. J. Hydrogen Energy, 1998, vol. 23, No. 6, pp. 451-456.
J. Zaman and A. Chakma, Production of Hydrogen and Sulfur from Hydrogen Sulfide, Fuel Processing Technology, 1995, vol. 41, pp. 159-198.
Karan et al., On Reaction Kinetics for the Thermal Decomposition of Hydrogen Sulfide, AIChE Journal, Feb. 1999, vol. 45, No. 2, pp. 383-389.
Slimane et al., Production of Hydrogen by Superadiabatic Decomposition of Hydrogen Sulfide, Proceedings of the 2002 U.S. DOE Hydrogen Program Review NREL/CP-610-32405, pp. 1-15.

* cited by examiner

*Primary Examiner*—Jerry Lorengo
*Assistant Examiner*—Rebecca Lee
(74) *Attorney, Agent, or Firm*—Alston & Bird LLP

(57) ABSTRACT

A process for substantially removing carbonaceous material from a composition comprising providing the composition having carbonaceous material, reacting the carbonaceous material with a sulfur compound, and forming products having carbon and sulfur, and the resulting composition and system used therefore.

3 Claims, No Drawings

PROCESS AND SYSTEM FOR DESTROYING CARBONACEOUS MATERIALS AND COMPOSITION AND SYSTEM THEREOF

REFERENCE TO RELATED APPLICATIONS

This application claims the benefit of U.S. Provisional Application, Ser. No. 60/926,007, filed on Apr. 24, 2007, entitled "Process for destruction of carbon dioxide and other carbonaceous chemicals" of Raymond C. Stenger and James A. Wasas, and the benefit of U.S. Provisional Application, Ser. No. 60/932,698, filed on Jun. 2, 2007 (possibly deemed filed on Jun. 2, 2007 due to U.S. Postal service practice), entitled "Process for destruction of carbon dioxide and other carbonaceous chemicals" of Raymond C. Stenger and James A. Wasas.

BACKGROUND OF THE INVENTION

The invention relates to destroying carbonaceous materials in compositions. Particular applicability can be found in removing carbon dioxide and hydrocarbons from gas and liquid compositions.

It is often desirable to remove carbonaceous materials from a composition or the atmosphere. For example, carbon sequestration is a process that removes carbon dioxide from the atmosphere. To help mitigate global warming, a variety of methods of capturing and storing carbon, as well as of enhancing natural sequestration processes, have been explored.

SUMMARY OF THE INVENTION

One aspect of the invention provides a process for substantially removing carbonaceous material from a composition comprising providing the composition having carbonaceous material; reacting the carbonaceous material with a sulfur compound; and forming products having carbon and sulfur.

This aspect of the invention includes chemical processes for the destruction of carbon dioxide and other carbonaceous chemicals by contact with sulfur, hydrogen sulfide or carbon disulfide. When carbon dioxide is destroyed with sulfur, the products produced include carbon and sulfur dioxide. When carbon dioxide is destroyed with hydrogen sulfide, the products produced include water and carbon disulfide or water, and carbon and either sulfur or sulfur dioxide. When carbon dioxide is destroyed with carbon disulfide, the products produced include carbon and sulfur dioxide. When carbonaceous materials other than carbon dioxide are destroyed with sulfur, the products of destruction include elemental carbon or other carbon-containing compounds, and typically include, but are not limited to, hydrogen sulfide, sulfur dioxide, and carbon disulfide.

Another aspect of the invention provides a composition substantially free of carbonaceous material, the carbonaceous material removed by a process comprising providing a chemical composition, having carbonaceous material, and a sulfur compound; and causing the carbonaceous material to contact the sulfur compound.

A further aspect of the invention provides a system for substantially removing carbonaceous material from a composition comprising a reactor for receiving the composition, having carbonaceous material, and a sulfur compound and producing products substantially free of the carbonaceous material.

DETAILED DESCRIPTION OF THE INVENTION

The invention provides a method of substantially removing carbonaceous material from a composition. The carbonaceous material is preferably carbon dioxide or hydrocarbon. Carbon dioxide may be a liquid or a gas and hydrocarbon may be solid or a liquid or a gas. In one embodiment, the carbon dioxide is formed by reacting dilute sulfuric acid with sodium bicarbonate or sodium carbonate. However, the carbon dioxide may be supplied from any source or any reaction. The carbon dioxide may be dried, such as by passing the carbon dioxide through a calcium chloride desiccant.

The composition may be any composition having carbonaceous material, but is, preferably, a liquid or gas. The carbonaceous material may exist in fossil fuels and other burning fuels, atmospheric gases, organic matter, elements of the earth and other sources, such as cement kilns and asphalt plants. One example of the composition is carbon dioxide, such as produced by a power plant burning fossil fuel.

The carbonaceous material is substantially removed, or destroyed, by providing the composition having carbonaceous material, reacting the carbonaceous material with a sulfur compound, and forming products having carbon and sulfur. "Substantially" means at least 50% removal, but removal may be as much as 100%. Preferably, at least 95% of the carbonaceous material is removed following contact with the sulfur compound. The extent of removal depends upon how much carbonaceous material contacts the sulfur compound, i.e., 100% contact=100% destruction, 95% contact=95% destruction, and no contact=no destruction. Similarly, "substantially" indicates complete in the case of complete contact or proportionately less than complete in the case of less than complete contact with the sulfur compound, providing that at least 50%, and preferably 95%, contact occurs. Other ranges of removal of carbonaceous material may include 70% to 100% removal and 85% to 100% removal.

The sulfur compounds may be any compound with sulfur. Preferably, the sulfur compound has sulfur, hydrogen sulfide or carbon disulfide. Sulfur may be supplied in a liquid or solid state, such as common yellow sulfur powder, and is, preferably, excited before reacting with the carbonaceous material to become a free radical reactive sulfur, i.e., in a disassociated state. Solid sulfur may be liquefied or vaporized before it reacts with the carbonaceous material. Converting sulfur to the liquid or gaseous state is achieved by electromagnetic radiation or by heating.

Oxygen exists naturally as a pair of atoms represented by $O_2$, and sulfur exists as $S_8$, which is stable and unreactive. However, when sulfur is disassociated into free radicals, sulfur becomes reactive. Sulfur sublimes into free radicals very slowly at room temperature and as temperature rises, the number of free radicals increases. When sulfur is in a liquid state, large amounts of free radicals are floating near the surface of the sulfur (to react with the $CO_2$ or $O_2$, if present) and at temperatures of about 444.6 degrees Celsius, which is the boiling point of sulfur, and above, a great amount of free radicals become vapor.

The reaction occurs when the carbonaceous material contacts the sulfur compound. The carbonaceous material and the sulfur compound may be injected into a reactor that has, preferably, an oxygen-free atmosphere, where the oxygen content is minimized. Sulfur often preferentially reacts with any oxygen present to produce sulfur dioxide if the atmosphere contains any oxygen, i.e., the preference of sulfur is to react with oxygen, rather than carbon dioxide, so the presence of oxygen may be wasteful of the sulfur. However, it is to be understood that trace amounts of oxygen may remain unreacted with sulfur, and for the purposes of this invention, the term "oxygen-free" as used herein can also mean between 0.01% oxygen to 0.00% oxygen. The contents of the reactor may be excited to accelerate the rate of reaction by electromagnetic radiation or heating to up to 1,500 degrees Celsius if the contents have high melting points.

In one embodiment of the reaction, carbon dioxide is injected, such as by bubbling, through carbon disulfide at a temperature of about room temperature to about 400 degrees Celsius. In this embodiment, carbon disulfide is oxidized with carbon dioxide.

The reaction may occur at a temperature of about room temperature to 1,500 degrees Celsius. Temperatures above room temperature, in some cases, may accelerate the reaction. The reactor may also be pressurized above atmospheric pressure to accelerate the reaction. Pressurization is particularly preferred in reactions involving hydrogen sulfide.

The reactants may be fed on a continuous basis into a reactor. Preferably, for laboratory use, the reactor is a batch reactor and, preferably, for industrial use, the reactor is a continuous tubular reactor. Once the reactor is charged with the reactants, it may be sealed and purged with inert gas, such as argon.

The products from the reaction include carbon, sulfur, sulfur dioxide, water, and carbon disulfide. Sulfur dioxide, carbon disulfide and water may be a liquid or gas and carbon is a solid.

In one embodiment, the carbonaceous material is carbon dioxide, the sulfur compound is hydrogen sulfide, and the products are water and carbon disulfide, elemental carbon, elemental sulfur, and/or sulfur dioxide. In this embodiment, the proportion of reactants may range from 1:2 to 3:2 molar volume of carbon dioxide to molar volume of hydrogen sulfide.

In another embodiment, the carbonaceous material is carbon dioxide, the sulfur compound is carbon disulfide, and the products are elemental carbon and sulfur dioxide. In yet another embodiment, the carbonaceous material is hydrocarbon, the sulfur compound is sulfur, and the products are carbon, hydrogen sulfide, carbon disulfide and/or sulfur dioxide.

These embodiments may be represented by the following chemical reactions:

$CO_2+S \rightarrow SO_2+C$  Chemical reaction 1 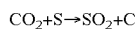

$CO_2+2H_2S \rightarrow 2H_2O+C+2S$  Chemical reaction 2 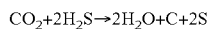

$CO_2+2H_2S \rightarrow 2H_2O+CS_2$  Chemical reaction 3 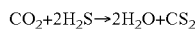

$3CO_2+2H_2S \rightarrow 2H_2O+3C+2SO_2$  Chemical reaction 4 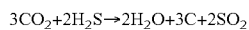

$2CO_2+CS_2 \rightarrow 3C+2SO_2$  Chemical reaction 5 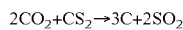

During the reaction, the carbonaceous material and the sulfur compound may be dissolved in sodium hydroxide to form a solution. These embodiments are represented by the following chemical reactions.

Chemical Reaction when Dissolved in Sodium Hydroxide 1:

$CO_2+2NaOH \rightarrow Na_2CO_3+H_2O$ 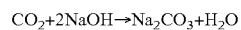

$H_2S+2NaOH \rightarrow Na_2S+2H_2O$ 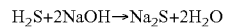

$Na_2CO_3+2Na_2S+3H_2O \rightarrow C+2S+6NaOH$ 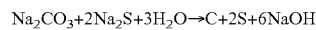

Alternative Reaction with Sodium Bicarbonate:

$NaHCO_3+2Na_2S+2H_2O \rightarrow C+2S+5NaOH$ 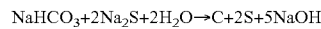

Chemical Reaction when Dissolved in Sodium Hydroxide 2:

$2NaOH+CO_2 \rightarrow Na_2CO_3+H_2O$ 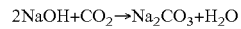

$2NaOH+H_2S \rightarrow Na_2S+2H_2O$ 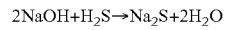

$3Na_2CO_3+2Na_2S+3H_2O \rightarrow 3C+2Na_2SO_3+6NaOH$ 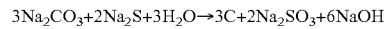

Chemical Reaction:

$3CO_2+2Na_2S \rightarrow 3C+2Na_2SO_3$ 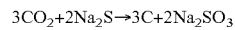

The products may be separated after they are formed. The products may be discharged and any solids, liquids and gases may be separated. The gaseous products may then be cooled. In one embodiment, the sulfur dioxide product is reacted with hydrogen sulfide to produce sulfur and water. In another embodiment, the sulfur dioxide product is reacted with oxygen and water to produce sulfuric acid. These embodiments are represented by the following reactions:

Sulfur can be Recovered by the Reaction:

$SO_2+2H_2S \rightarrow 2H_2O+3S$ 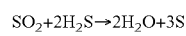

Or the $SO_2$ Used to Produce Sulfuric Acid:

$2SO_2+O_2+2H_2O \rightarrow 2H_2SO_4$ 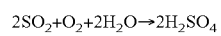

The sulfur dioxide may also be condensed at about −10 degrees Celsius or converted to sulfite-based chemicals and collected. Hydrogen sulfide may be collected at a temperature less than −60 degrees Celsius. Alternatively, the hydrogen sulfide may be dissolved in sodium hydroxide solution to produce sodium sulfide.

Excess sulfur may be provided into the reactor. Preferably, any excess amount ranges from 1 to 20%, but more or less may be used if required by the application. As such, any unreacted sulfur may be recovered by washing the composition, i.e., solid residues, with carbon disulfide. Sulfur dioxide gases may be collected by washing the products to create sodium sulfite.

The process, which destroys carbon dioxide and other carbonaceous materials by rearranging their atomic components, simultaneously creates new carbon molecules. These carbon molecules are amorphous or are structured. The structured carbon molecules are of various types with various physical properties, and include, but are not limited to, graphitic carbon, diamond like carbon, fullerenes, buckyballs, C60, nanotube and nanofiber like structured carbon. Under controlled conditions, such as seeding desired species, carbon nanotubes, for example, may be created and/or grown.

The invention also provides a composition substantially free of carbonaceous material, where the carbonaceous material is removed by the above-described process and a system for substantially removing carbonaceous material from the composition. The system requires a reactor. On a small scale, a batch-type reaction may be performed in a single or multi-necked glass flask, where the necks are fitted with adapters for the addition of reactants and exit of products. The reactor may be made of temperature-resistant borosilicate glass or quartz glass, such that supplied by Pyrex®, Kimble® Glass, United Glass Technologies and Buchi® Corporation. Temperature may be measured by a thermometer through glass contact, or by other means, such as non-contact laser guided infrared readings, and product gases may be cooled with a Vigreux column. In one embodiment, the Vigreux column is mounted above the reactor to serve as a condenser. Additionally, the carbon dioxide reactant gas may be prepared in a gas generator and then passed through a calcium chloride desiccant to dry the gas.

On a large scale, the reactor may be a downward pitched rotary kiln type reactor, an ultrasonic reactor, or other of the numerous types commonly used for contacting reactants. These reactors may be glass lined reactors. The equipment is not limited to that described in the application. Any equipment may be used as long as it performs the steps of the process.

Embodiments and examples of the invention also include the following. The examples are presented to illustrate the process, composition and system of the invention. These examples are intended to aid those skilled in the art in understanding the present invention. The present invention is, however, in no way limited thereby.

One embodiment includes a process for the substantial destruction of carbonaceous material, where carbon dioxide is the carbonaceous material and reacts with sulfur to produce a composition of matter. This embodiment of the process includes the following:

(a) injecting the carbon dioxide into a reactor in an oxygen-free atmosphere (sulfur will preferentially react with any oxygen present and produce sulfur dioxide if the atmosphere contains any oxygen, as described above) at up to 1,500 degrees Celsius, where the carbon dioxide contacts sulfur in the liquid or gaseous state, and reacts to form elemental carbon and sulfur dioxide gas. With molten sulfur, the carbon dioxide is contacted with the liquid sulfur by use of a fine stream. The stream of carbon dioxide gas passes through the layer of very dense sulfur dioxide that clings to the surface of the sulfur in a stationary reactor, thereby contacting the sulfur-free radicals to enable the chemical reaction. Reactions performed at a temperature at or above the boiling point of sulfur are preferred. However, it has also been demonstrated that reactions conducted at temperatures below the boiling point of sulfur, such as at about 120 degrees Celsius, still resulted in fine sulfur particles collecting in a Vigreux column above the reactor when insufficient carbon dioxide was present to react with the sulfur vapor;

(b) it has been demonstrated that even just at the melting point of sulfur, 115 degrees Celsius, the surface of the sulfur, in a borosilicate glass flask, for example, is immediately covered with black particles of carbon when the carbon dioxide impinges on the liquid sulfur; and/or (c) separating the gaseous sulfur dioxide produced from the residue of elemental carbon and elemental sulfur.

In this embodiment, the chemical reaction is: $CO_2 + S \rightarrow SO_2 + C$. Sulfur can be recovered by the reaction, as follows: $SO_2 + 2H_2S \rightarrow 2H_2O + 3S$. Alternatively, the $SO_2$ can be used to produce sulfuric acid, as follows: $2SO_2 + O_2 + 2H_2O \rightarrow 2H_2SO_4$.

It has been demonstrated that the carbon dioxide gas used in this embodiment of the process may be prepared by the reaction of dilute sulfuric acid on sodium bicarbonate or sodium carbonate in a gas generator, with the carbon dioxide gas that is generated by this reaction being passed through a calcium chloride desiccant to dry the gas. The sulfur used in this embodiment may be any sulfur powder, such as a yellow sulfur powder. Reactions may be carried out in temperature-resistant laboratory-type borosilicate or quartz glass vessels. Batch-type reactions can be performed in single or multi-necked borosilicate glass flasks, the necks being of standard taper ground glass and fitted with adapters enabling:

(a) the addition of carbon dioxide gas through impinge-type pointed glass tubing, (b) the measurement of temperature with a (glass contact only) thermometer, and (c) the exit of sulfur dioxide gas through a Vigreux column and into a collector.

The Vigreux column may be mounted above the flask and may be used as a baffled air-cooled reflux condenser to limit the escape of sulfur, especially for low temperature reactions, i.e., below the boiling point of sulfur. Since sulfur dioxide condenses at about −10 degrees Celsius, it can be collected with a refrigerated condenser and receiver flask for analysis and use.

A benefit of this embodiment of the process if used in a power plant includes the destruction of carbon dioxide (to maintain carbon neutrality or toward maintaining carbon neutrality) and the production of two commercial products, carbon and sulfur dioxide. The carbon dioxide may also be condensed (as is currently being done for sequestration) in the power plant and transported to plants that burn sulfur in air or oxygen to produce sulfur dioxide (for sulfuric acid production, for example). Burning the sulfur in carbon dioxide would produce sulfur dioxide, which could be the desired product, and in addition, produce carbon. The carbon would be as pure as the source carbon dioxide. The produced carbon may be used for, but is not limited to, providing carbon to carbon fiber manufacturers and other users of carbon. If an excess of sulfur is present in the carbon, the carbon and sulfur can be separated by washing with carbon disulfide, which will dissolve sulfur, but not carbon.

This embodiment may be industrially implemented in ways that include, but are not limited to, the following:

(a) existing hydrocarbon burning power plants may use high sulfur content fuel, instead of an often more expensive low sulfur content fuel. Preferably, a lean oxygen burn would be used to minimize excess oxygen in the effluent gases. By feeding hot effluent gases of mixed carbon dioxide and sulfur dioxide (with or without other components of air, such as nitrogen, if air was the oxidizer) into a downward pitched rotary kiln type reactor (same or similar to those used in the manufacture of cement), for example, where sulfur is also being fed on a continuous basis, the hot carbon dioxide reacts with the sulfur and the discharge from the rotary kiln type reactor is carbon, sulfur dioxide, and other components of air such as nitrogen, if air were the oxidizer in the power plant. The carbon is of a high purity if the reactor is operated sulfur lean, or mixed with sulfur if the reactor is operated with excess sulfur (excess sulfur is separated from carbon by washing with carbon disulfide). After separating the solids from the gases, with, for example, a conventional gravity separator and bag house technology, and cooling the gases, sulfur dioxide may be piped to a sulfuric acid production plant or other sulfur-based chemical plant, condensed at −10 degrees Celsius and sold as a liquid to users of this chemical in this form, or collected by washing the product gases in, by way of example and not intending to be limiting, a sodium hydroxide washing tower to produce sodium sulfite.

(b) hydrocarbon burning power plants may also collect carbon dioxide and send it by pipe or tanker to companies that burn sulfur to produce sulfur dioxide.

Another embodiment includes a process for the substantial destruction of carbon dioxide when it reacts with hydrogen sulfide (from sour gas or other source) in the proportion of one molar volume of carbon dioxide to two molar volumes of hydrogen sulfide to produce a composition of matter. This embodiment of the process includes the following steps:

(a) injecting carbon dioxide and hydrogen sulfide into a reactor in an oxygen-free atmosphere (hydrogen sulfide will preferentially react with any oxygen present and produce sulfur dioxide if the atmosphere contains any oxygen) at up to 1,500 degrees Celsius in the appropriate proportions to react and form water, and either elemental carbon and sulfur dioxide, or carbon disulfide.

(b) separating the products of this reaction.

The chemical reaction may be: $CO_2+2H_2S \rightarrow 2H_2O+C+2S$. Alternatively, the chemical reaction may be: $CO_2+2H_2S \rightarrow 2H_2O+CS_2$. In addition, the chemical reactions, when dissolved in sodium hydroxide, may be the following:

$$CO_2+2NaOH \rightarrow Na_2CO_3+H_2O$$

$$H_2S+2NaOH \rightarrow Na_2S+2H_2O$$

$$Na_2CO_3+2Na_2S+3H_2O \rightarrow C+2S+6NaOH.$$

An Alternative Reaction with Sodium Bicarbonate May be:

$$NaHCO_3+2Na_2S+2H_2O \rightarrow C+2S+5NaOH.$$

The Claus Process is currently known in the art as a standard of the industry for converting hydrogen sulfide into sulfur. Hydrogen sulfide occurs naturally in natural gas and is referred to as "sour gas" when the hydrogen sulfide concentration is high and is also produced while refining petroleum or other industrial processes. In the Claus Process, which has been used for over 100 years, just enough of the hydrogen sulfide is oxidized with air or oxygen into sulfur dioxide to react with the balance of the hydrogen sulfide and produce elemental sulfur and water. Part of this process is accomplished at temperatures above 850 degrees Celsius and part is accomplished in the presence of catalysts, such as activated alumina or titanium dioxide. The chemical reactions of the Claus Process are: $2H_2S+3O_2 \rightarrow 2SO_2+2H_2O$ and then $4H_2S+2SO_2 \rightarrow 3S_2+4H_2O$.

One benefit of this embodiment is that substituting carbon dioxide for oxygen would accomplish the same net result of eliminating the hydrogen sulfide, thereby making the Claus Process obsolete because the operating parameters of this embodiment are less stringent. Other benefits include the destruction of carbon dioxide toward or for carbon neutrality and the production of carbon and sulfur or sulfur dioxide, which may be condensed at −10 degrees Celsius. Among other benefits, by way of example and not intending to be limiting, the condensed products may be transported for purposes including, but not limited to, the sale of the products. As an additional benefit, the separation of the products of hydrogen sulfide from natural gas would be unnecessary when the gas is destined for combustion in power plants that are equipped to use this embodiment, thereby making the gas less expensive. A power plant may benefit from lower fuel costs by burning impure crude or unrefined gas and may produce extra energy from burning the hydrogen sulfide in an exothermic reaction. The reaction between the mixed carbon dioxide, sulfur dioxide power plant effluent and sulfur to convert the carbon dioxide to sulfur dioxide could proceed unhindered and all the sulfur dioxide could be collected simultaneously. In addition, by way of example and not intending to be limiting, this embodiment of the invention can provide a process for the sulfur dioxide to be transported in ways, including, but not limited to, being shipped in appropriate tankers. Further, by way of example and not intending to be limiting, this embodiment of the invention can provide a process for the sulfur to be sold and transported in appropriate tankers.

It has been demonstrated that the hydrogen sulfide gas used in this embodiment of the process may be prepared by the reaction of dilute sulfuric acid on sodium sulfide in a gas generator and then passed through a desiccant to dry it. The carbon dioxide gas used in this embodiment of the process can be prepared by the reaction of dilute sulfuric acid on sodium bicarbonate or sodium carbonate in a gas generator, with the carbon dioxide gas generated by this reaction being passed through a calcium chloride desiccant to dry the gas. The first chemical reaction shown below may take place at room temperature or above by mixing the two gases in the ratio of 44.4 parts of carbon dioxide to 100 parts of hydrogen sulfide, for example, and waiting several days at atmospheric pressure or compressing them. This same ratio of carbon dioxide and hydrogen sulfide combine rapidly at elevated temperatures and pressures with the second reaction shown below producing carbon disulfide and water, predominating at temperatures above about 600 degrees Celsius. Dissolving the gases in sodium hydroxide and placing the flask of mixed dissolved gases in sunlight, which accelerates the reaction, will also result in a reaction, although much slower. In one example, these aqueous reactions have been demonstrated by dissolving 106 grams of pure anhydrous sodium carbonate in 400 ml ("milliliters") of warm distilled water and mixing this with 156.1 grams of pure anhydrous sodium sulfide dissolved in 800 ml of warm distilled water or dissolving 84 grams of pure anhydrous sodium bicarbonate in one liter of warm distilled water and mixing this with 156.1 grams of pure anhydrous sodium sulfide dissolved in 800 ml of warm distilled water.

The current embodiment may be industrially implemented in ways that include, but are not limited to, the following:

(a) Natural gas-burning power plants that employ this embodiment of the invention could use high sulfur content gas, including sour gas, instead of a more expensive low sulfur content gas. Preferably, a lean oxygen burn would be used to minimize excess oxygen. By feeding hot effluent gases of mixed carbon dioxide and sulfur dioxide (with or without other components of air such as nitrogen, if air were the oxidizer) into a downward pitched rotary kiln type reactor (pressurization greatly accelerates the reaction velocity) with hydrogen sulfide being fed on a continuous basis, the hot carbon dioxide reacts with the hydrogen sulfide. The discharge from the rotary kiln type reactor is carbon, sulfur, water, and other components of air, such as nitrogen, if air is the oxidizer in the power plant. Separating the solid products from the discharge gases may be accomplished with a conventional gravity separator and bag house technology. Sulfur dissolves in carbon disulfide, but carbon does not.

(b) Gas fields that are distant from power plants that use crude gas, generally, have sites with self-produced carbon dioxide abundantly available at these sites because of the combustion of unwanted fractions. This crude gas may react hydrogen sulfide with carbon dioxide to eliminate the hydrogen sulfide and produce sulfur and water much like in the Claus Process (may use the same equipment). Pressurization greatly accelerates the reaction velocity. Again, separation may be done with a conventional gravity separator and bag house technology because sulfur dissolves in carbon disulfide, but carbon does not. In addition, this embodiment of the invention can provide a process for gas fields to sell crude gas to other entities, including, but not limited to, power plants.

Another embodiment includes a process for the substantial destruction of carbon dioxide when it reacts with hydrogen sulfide (from sour gas or other source) in the proportion of three molar volumes of carbon dioxide to two molar volumes of hydrogen sulfide to produce a composition of matter. This embodiment of the process includes the following steps:

(a) injecting carbon dioxide and hydrogen sulfide into a reactor in an oxygen-free atmosphere (hydrogen sulfide will preferentially react with any oxygen present and produce sulfur dioxide if the atmosphere contains any oxygen) at up to 1,500 degrees Celsius in the appropriate proportions to react and form water, elemental carbon, and sulfur dioxide.

(b) separating the products of this reaction.

The chemical reaction is: $3CO_2 + 2H_2S \rightarrow 2H_2O + 3C + 2SO_2$. When dissolved in sodium hydroxide, the chemical reaction can be the following:

$$2NaOH + CO_2 \rightarrow Na_2CO_3 + H_2O$$

$$2NaOH + H_2S \rightarrow Na_2S + 2H_2O$$

$$3Na_2CO_3 + 2Na_2S + 3H_2O \rightarrow 3C + 2Na_2SO_3 + 6NaOH$$

Alternatively, the Chemical Reaction can be:

$$3CO_2 + 2Na_2S \rightarrow 3C + 2Na_2SO_3$$

Relating to the current invention, one benefit of this embodiment is that substituting carbon dioxide for oxygen would accomplish the same net result of eliminating the hydrogen sulfide, thereby making the Claus Process obsolete because the operating parameters of this embodiment of the new process are much less stringent. In addition, other benefits result from this embodiment. They include the destruction of carbon dioxide toward or for carbon neutrality and the production of carbon and sulfur dioxide, which is easily condensed at −10 degrees Celsius for shipment and sale to users. Users may include, but are not limited to, manufacturers of sulfuric acid, fertilizers, insecticides and other sulfur-based chemicals. As an additional benefit, the complete separation of hydrogen sulfide from natural gas would be unnecessary when the gas is destined for combustion in power plants that are equipped to use this embodiment of the new process, thereby making the gas less expensive. The power plant may benefit from lower fuel costs by burning impure crude or unrefined gas and could produce extra energy from burning the hydrogen sulfide in an exothermic reaction. The reaction between the mixed carbon dioxide, sulfur dioxide power plant effluent and sulfur to convert the carbon dioxide to sulfur dioxide could proceed unhindered and all the sulfur dioxide could be collected simultaneously. In addition, by way of example and not intending to be limiting, this embodiment of the invention can provide a process for the sulfur dioxide to be transported in ways, including, but not limited to, being shipped in appropriate tankers. Further, by way of example and not intending to be limiting, this embodiment of the invention can provide a process for the sulfur to be sold and transported in appropriate tankers.

It has been demonstrated that the hydrogen sulfide gas used in this embodiment of the process can be prepared by the reaction of dilute sulfuric acid on sodium sulfide in a gas generator, and this gas passed through a desiccant to dry it. The carbon dioxide gas used in this embodiment of the process can be prepared by the reaction of dilute sulfuric acid on sodium bicarbonate or sodium carbonate in a gas generator, with the carbon dioxide gas generated by this reaction passed through a calcium chloride desiccant to dry the gas. The first chemical reaction shown in this embodiment may take place even at room temperature by mixing the two gases in the ratio of 133.4 parts of carbon dioxide to 100 parts of hydrogen sulfide and waiting several days at atmospheric pressure. This same ratio of carbon dioxide and hydrogen sulfide combine rapidly at elevated pressures and temperatures (see Claus Process). Dissolving the gases in sodium hydroxide and placing the flask of mixed dissolved gases in sunlight will also result in a reaction, although much slower. These aqueous reactions have been demonstrated by dissolving 106 grams of pure anhydrous sodium carbonate in 400 ml of warm distilled water and mixing this with 78 grams of pure anhydrous sodium sulfide dissolved in 400 ml of warm distilled water, or dissolving 84 grams of pure anhydrous sodium bicarbonate in one liter of warm distilled water and mixing this with 78 grams of pure anhydrous sodium sulfide dissolved in 100 ml of warm distilled water. Bubbling carbon dioxide into a 20% solution by weight of sodium sulfide in distilled water has been demonstrated to result in the formation of carbon on the frittered bubbler used for injecting the carbon dioxide gas, and the formation of sodium sulfite in solution as shown in the reaction equation.

This embodiment may be industrially implemented in ways that include, but are not limited to, the following:

(a) Existing natural gas burning power plants that employ this new technology could use high sulfur content gas or sour gas, instead of a more expensive low sulfur content gas. By feeding their hot effluent gases of mixed carbon dioxide and sulfur dioxide (with or without other components of air such as nitrogen, if air was the oxidizer) into a downward pitched rotary kiln type reactor, where hydrogen sulfide was also being fed on a continuous basis, the hot carbon dioxide would react with the hydrogen sulfide and the discharge from the rotary kiln type reactor would be carbon, sulfur dioxide, water and other components of air such as nitrogen, if air were the oxidizer in the power plant. In this embodiment, the power plant would not have to operate oxygen lean when the objective is to produce sulfur dioxide. After separating the solids from the gases using a conventional gravity separator and bag house technology and cooling the gases (with a high temperature water condensing first stage to collect the water without dissolved sulfur dioxide or using this water to dissolve sodium hydroxide, for example, if sodium sulfite were to be prepared), sulfur dioxide may be condensed at −10 degrees Celsius. Thereby, by way of example and not intending to be limiting, it would be possible to transport and/or sell the condensed sulfur dioxide as a liquid to other users. Alternatively, the product gases may be washed in, by way of example and not intending to be limiting, a sodium hydroxide washing tower to produce sodium sulfite.

(b) Gas fields that are distant from a power plant that use crude gas may react hydrogen sulfide with carbon dioxide to eliminate the hydrogen sulfide, and produce sulfur dioxide, carbon and water. The same equipment that may be used in the Claus Process may be used in this embodiment. Pressurization greatly accelerates the reaction velocity. In addition, this embodiment of the invention can provide a process for gas fields to sell crude gas to other entities, including, but not limited to, power plants. As noted above, the sulfur dioxide may be condensed or reacted to produce sulfite based chemicals, which by way of example and not intending to be limiting, may be sold.

Another embodiment includes a process for the substantial destruction of carbon dioxide when it reacts with carbon disulfide to produce a composition of matter. This embodiment of the process includes the following steps:

(a) injecting carbon dioxide and carbon disulfide into a reactor in an oxygen-free atmosphere at up to 1,500 degrees Celsius in the appropriate proportions to react and form carbon, and sulfur dioxide.

(b) separating the products of this reaction.

The Chemical Reaction is:

$$2CO_2 + CS_2 \rightarrow 3C + 2SO_2.$$

The reaction has been demonstrated by bubbling carbon dioxide gas through carbon disulfide with a frittered glass bubbler. Even at room temperature, carbon forms slowly on the frittered glass. This reaction is very fast at high temperatures and has been demonstrated to have peaked at a temperature of about 400 degrees Celsius. By way of example, and not intending to be limiting, the carbon dioxide gas used in this embodiment of the process can be prepared by the reaction of dilute sulfuric acid on sodium bicarbonate or sodium carbonate in a gas generator, with the carbon dioxide gas generated by this reaction passed through a calcium chloride desiccant to dry the gas.

The current embodiment can be industrially implemented in a way that includes, but is not limited to, the following: in the event that it were necessary to dispose of carbon disulfide without the production of carbon dioxide, as, by way of example and not intending to be limiting, is the case with current combustion technology, carbon disulfide can be oxidized with carbon dioxide in ultrasonic reactors.

An additional embodiment includes a process for the substantial destruction of a carbonaceous material other than carbon dioxide when it reacts with sulfur in the liquid or gaseous state, which is achieved by liquefying or vaporizing solid sulfur by electromagnetic radiation or by heating, to produce a composition of matter. This embodiment of the process includes the following steps:

(a) placing the carbonaceous material other than carbon dioxide in a reactor in an oxygen-free atmosphere at up to 1,500 degrees Celsius where the carbonaceous material contacts sulfur in the liquid or gaseous state, and reacts to form hydrogen sulfide, carbon of various forms and/or other carbon-containing compounds and sometimes carbon disulfide, sulfur dioxide, etc., depending on the composition of the material being destroyed.

(b) separating the gaseous products produced from the residue of elemental carbon or other carbon-containing compounds.

This embodiment has been demonstrated using polyvinyl chloride, PVC, to represent the vast family of difficult to destroy and sometimes toxic carbon-containing compounds (hydrocarbons) because toxic gases with dioxins result even with very high temperature combustion. Batch-type reactions may be performed in multi-necked borosilicate glass reaction vessels, the necks being of standard taper ground glass and fitted with adapters enabling:

(a) the addition of an inert gas, such as, but not limited to, argon, which is preferred, through glass tubing to purge the system before beginning and after finishing (this could also be used for the addition of liquid or gaseous test specimens), (b) the measurement of temperature with a thermometer, and/or (c) the exit of gas through a Vigreux column and then into collectors.

The Vigreux column can be mounted above the reactor and be used as a baffled air cooled reflux condenser to limit the escape of sulfur (for low temperature reactions below the boiling point of sulfur). Since sulfur dioxide condenses at about −10 degrees Celsius, it can be collected with a refrigerated condenser and receiver flask for analysis and use. Hydrogen sulfide can pass through this trap and into another that would need to be at a temperature less than −60 degrees Celsius to collect it, or be dissolved in sodium hydroxide solution in a gas washing bottle to produce sodium sulfide.

Sulfur powder several inches deep can be charged into the reactor and a section of PVC tubing (or other difficult to destroy solid or liquid hydrocarbon) can be placed on top of the sulfur. The reactor should then be sealed and purged with argon or other inert gas. If a liquid or gaseous hydrocarbon is to be destroyed on a small-scale batch test basis, it can be added to the reactor after the reactor is purged through a suitable adapter. In the case of PVC destruction, it has been demonstrated that a section of PVC pipe looked much like a ring sat floating on top of the liquid sulfur until it reaches a temperature of about 200 degrees Celsius, at which time small bubbles were observed surrounding the now engorged PVC "ring." As temperature rose, the reaction rate and amount of gas evolved accelerated. Both hydrogen sulfide and hydrochloric acid evolved from the reactor leaving a residue of carbon mixed into the sulfur.

This embodiment of the process will chemically disassemble hydrocarbons at very much lower temperatures and with much less stringent operating conditions than necessary in some previous processes, such as, for example, the process disclosed in U.S. Pat. No. 4,581,442.

This embodiment of the process can be industrially implemented in ways including, but not limited to, the following: rotary kilns like those used to manufacture cement may also be used for converting carbonaceous compounds, including hydrocarbons, into their simpler components by continuously feeding them and sulfur into the kiln at the appropriate operating temperature for that particular carbonaceous material. In general, intimate contact between sulfur-free radicals and the carbonaceous material is required for rapid reaction. Substantial destruction of the material requires the presence of an excess of sulfur. The excess sulfur can be recovered by washing the solid residues with carbon disulfide in which sulfur is readily soluble. This is a process that may destroy complex nuisance chemicals like VX nerve gas and PVC plastic without the production of hazardous byproducts.

While the invention has been described in detail and with reference to specific embodiments thereof, it will be apparent to one skilled in the art that various changes and modifications can be made therein without departing from the spirit and scope thereof. Thus, it is intended that the invention covers the modifications and variations of this invention provided they come within the scope of the appended claims and their equivalents.

The invention claimed is:

1. A process for substantially removing carbonaceous material from a composition comprising:
   providing the composition having a carbonaceous material comprising carbon dioxide;
   reacting the carbonaceous material with sulfur; and
   forming products comprising elemental carbon and sulfur dioxide.

2. A process for substantially removing carbonaceous material from a composition comprising:
   providing the composition having a carbonaceous material comprising carbon dioxide;
   reacting the carbonaceous material with hydrogen sulfide; and
   forming products comprising water, elemental carbon, and elemental sulfur.

3. A process for substantially removing carbonaceous material from a composition comprising:
   providing the composition having a carbonaceous material comprising carbon dioxide;
   reacting the carbonaceous material with carbon disulfide; and
   forming products comprising elemental carbon and sulfur dioxide.

* * * * *